Dec. 15, 1931.  J. TRITSCHLER  1,836,633
DEVICE FOR DROPPING OF SOLID BODIES FROM AIRCRAFT
Filed March 31, 1930    5 Sheets-Sheet 1
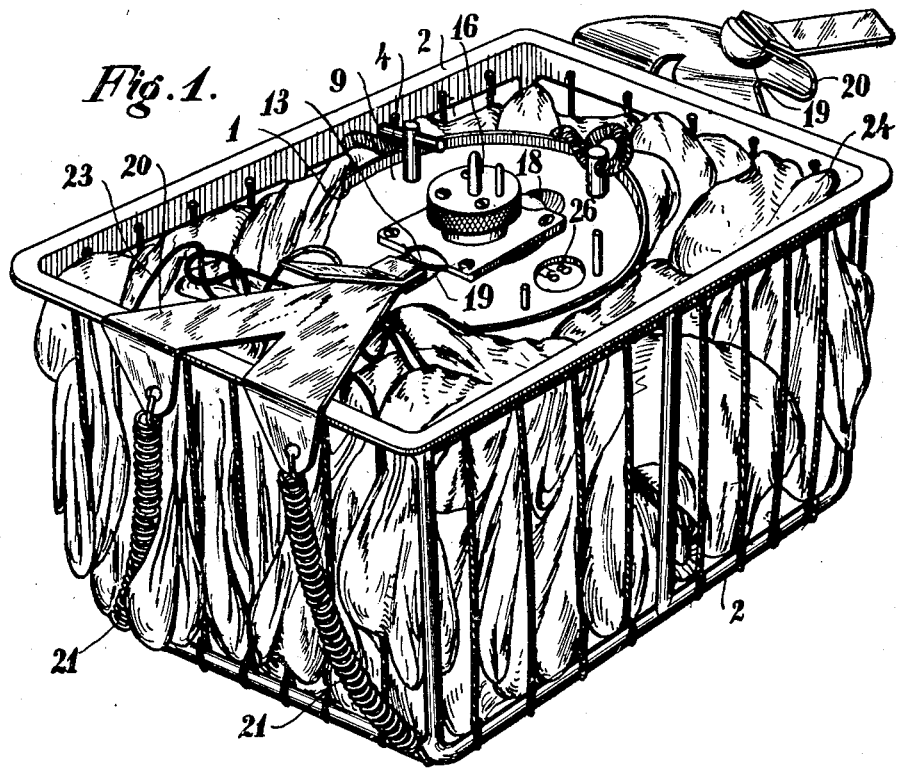
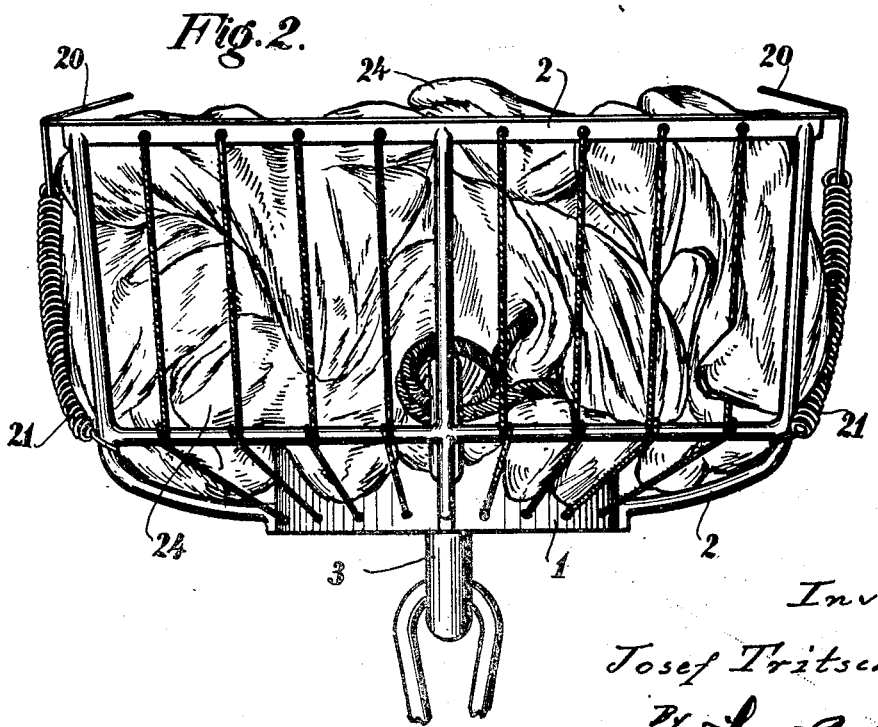
Inventor:
Josef Tritschler
By [signature]
Attorney.

Dec. 15, 1931.  J. TRITSCHLER  1,836,633

DEVICE FOR DROPPING OF SOLID BODIES FROM AIRCRAFT

Filed March 31, 1930   5 Sheets-Sheet 2

Inventor:
Josef Tritschler
Attorney.

Dec. 15, 1931. J. TRITSCHLER 1,836,633
DEVICE FOR DROPPING OF SOLID BODIES FROM AIRCRAFT
Filed March 31, 1930 5 Sheets-Sheet 4
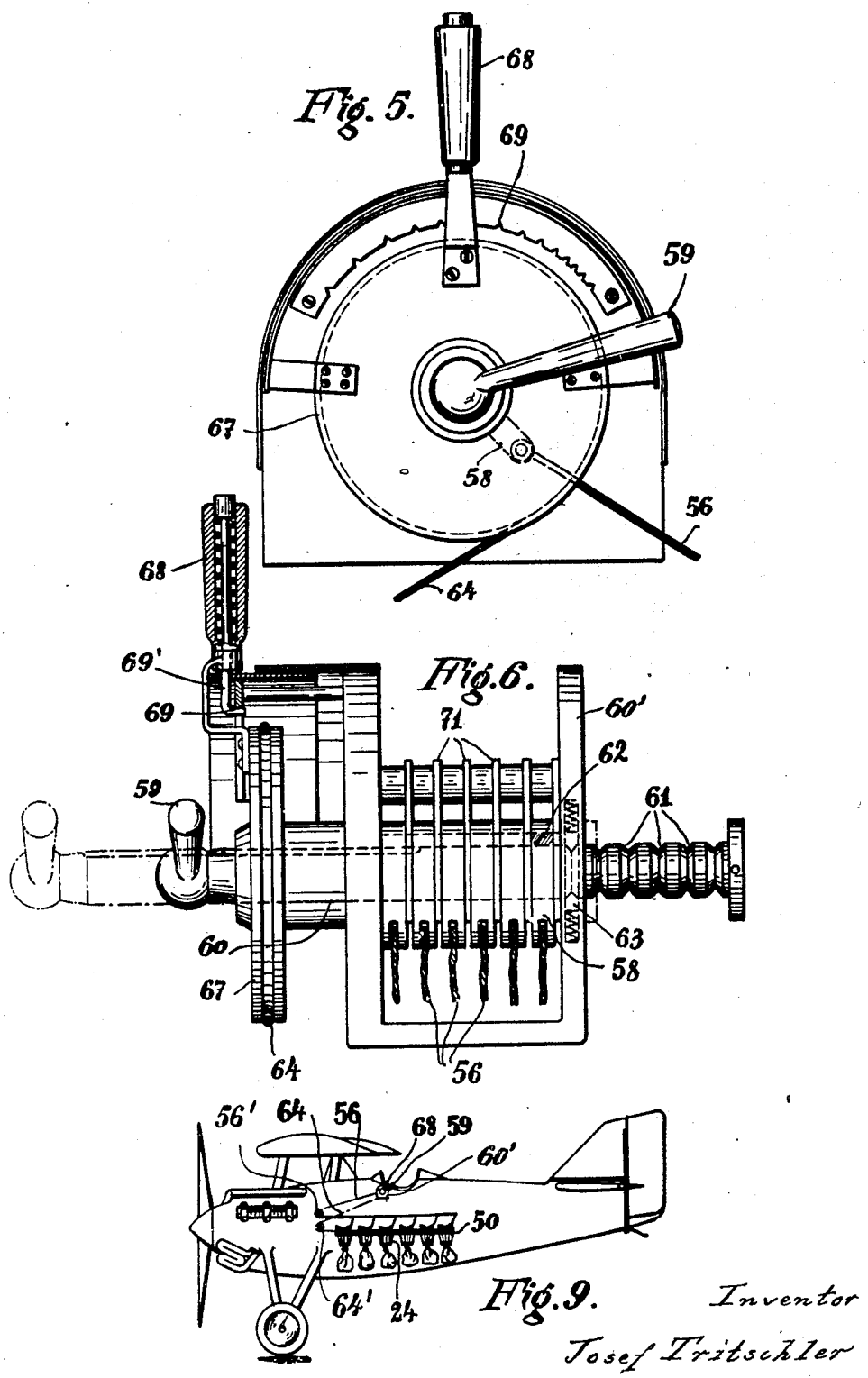

Dec. 15, 1931.    J. TRITSCHLER    1,836,633
DEVICE FOR DROPPING OF SOLID BODIES FROM AIRCRAFT
Filed March 31, 1930    5 Sheets-Sheet 5
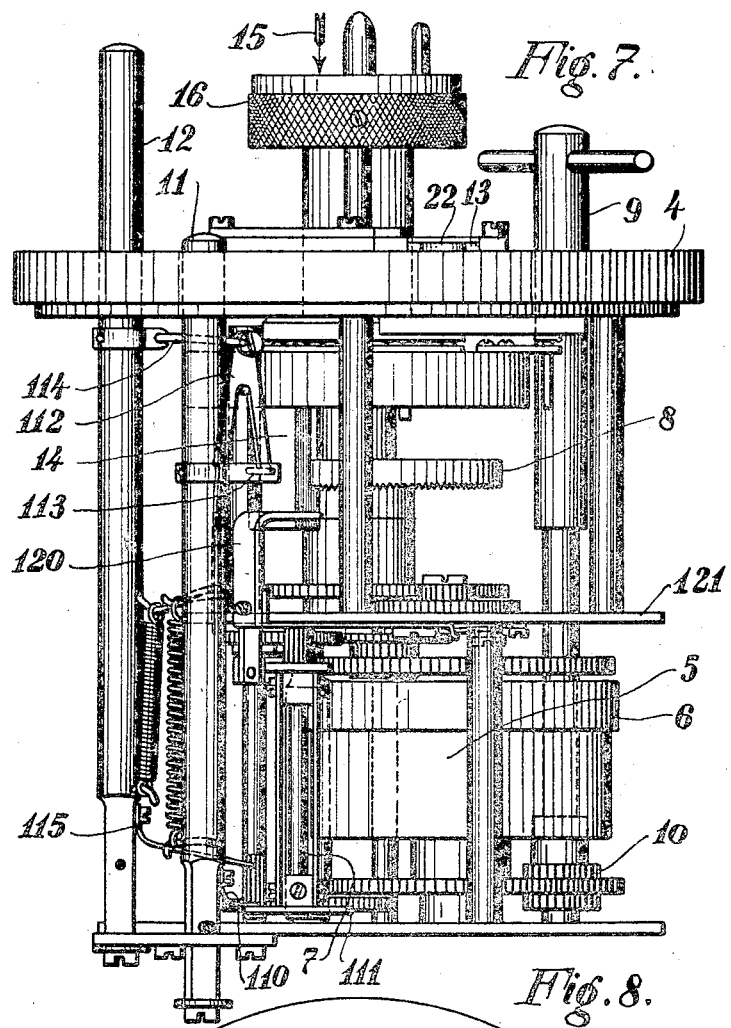
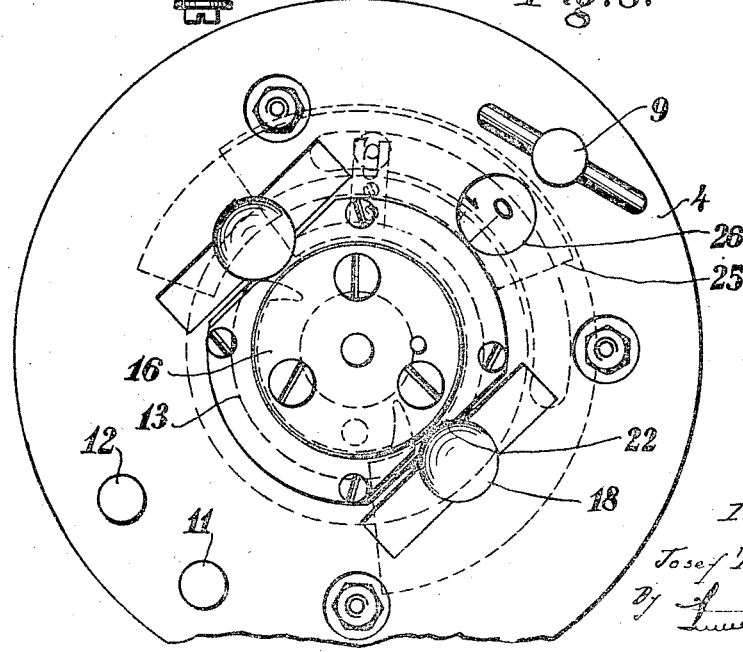

Patented Dec. 15, 1931

1,836,633

UNITED STATES PATENT OFFICE

JOSEF TRITSCHLER, OF BASEL, SWITZERLAND

DEVICE FOR DROPPING OF SOLID BODIES FROM AIRCRAFT

Application filed March 31, 1930, Serial No. 440,338, and in Switzerland and Germany April 8, 1929.

The present invention relates to devices for controlling the descent of bodies dropped by parachutes from air crafts and particularly to such devices where the bodies are made to descend very rapidly unto a certain height above the ground and thence are made to descend slowly by the spreading of a parachute. This course is obtained by means of a clockwork timed so as to open the parachute early enough for ensuring a slow landing speed of the dropped bodies.

The clock-work is provided with a timing device for determining the elapsed interval between the moment of dropping and of opening the parachute. This device may be used for dropping the bodies singly by hand or for dropping mechanically whole series of bodies. The latter procedure may be employed when it is intended to drop a number of bodies at different places and from different heights.

The drawings represent several working examples of devices according to the present invention.

The Fig. 1 is a perspective view of the closed device without any charge. One of the ties for holding the parachute is shown unhooked.

The Fig. 2 is a similar view from the side and showing the means for suspending a charge.

Figure 3:
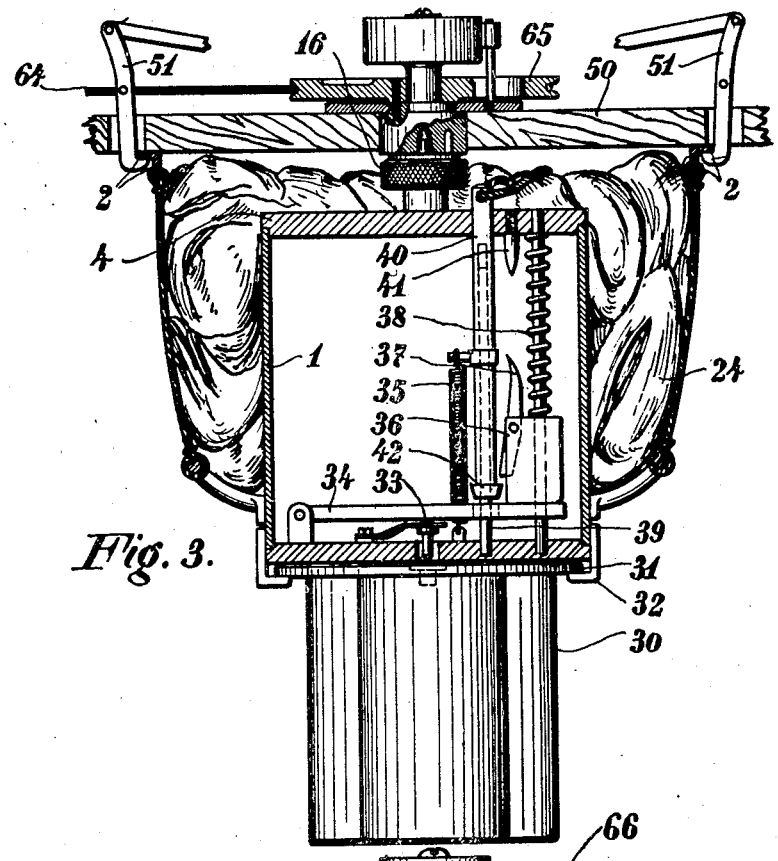

The Fig. 3 is a longitudinal section of another form with means for lighting a flare-body.

Figure 4:
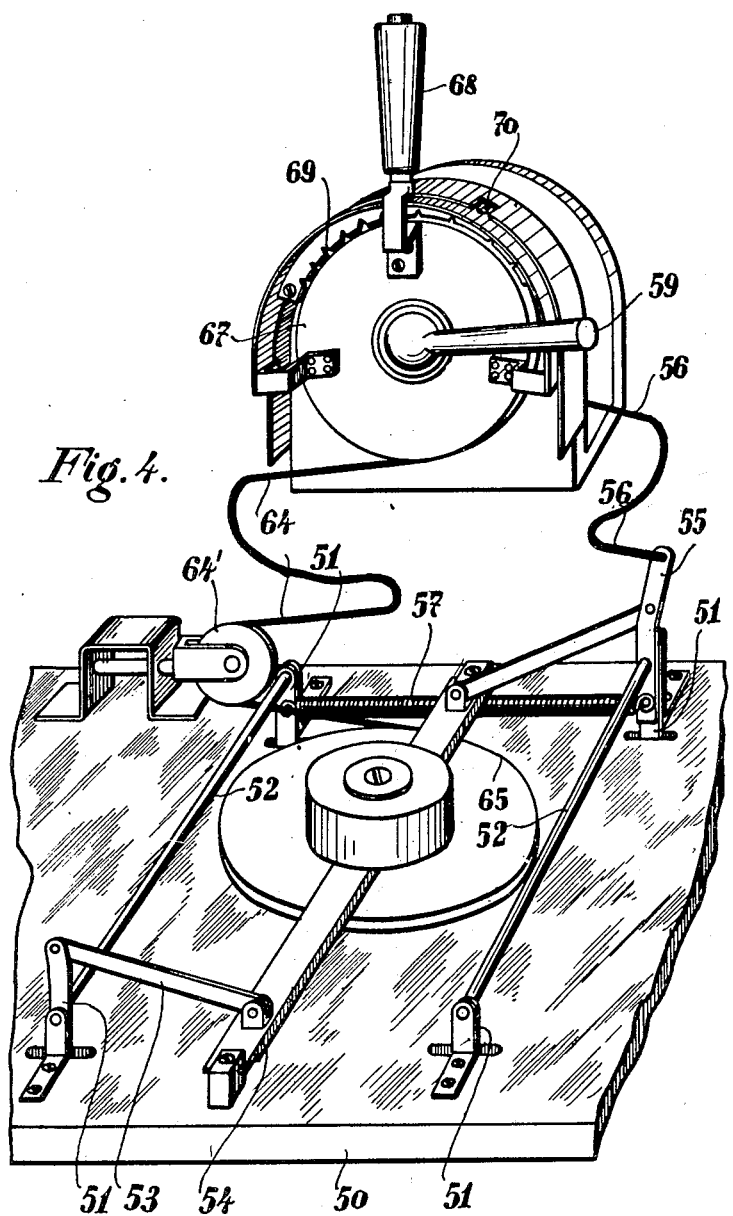

The Fig. 4 is a perspective view of a controlling device placed within reach of the pilot for timing and dropping the single devices.

The Fig. 5 is a front view of a part of Fig. 4.

The Fig. 6 is a side elevation of the same.

The Fig. 7 is a view of the clock-movement without casing.

The Fig. 8 is a plan view of the same.

The Fig. 9 is a diagrammatical view of the arrangement of the devices in an air craft.

Figure 10:
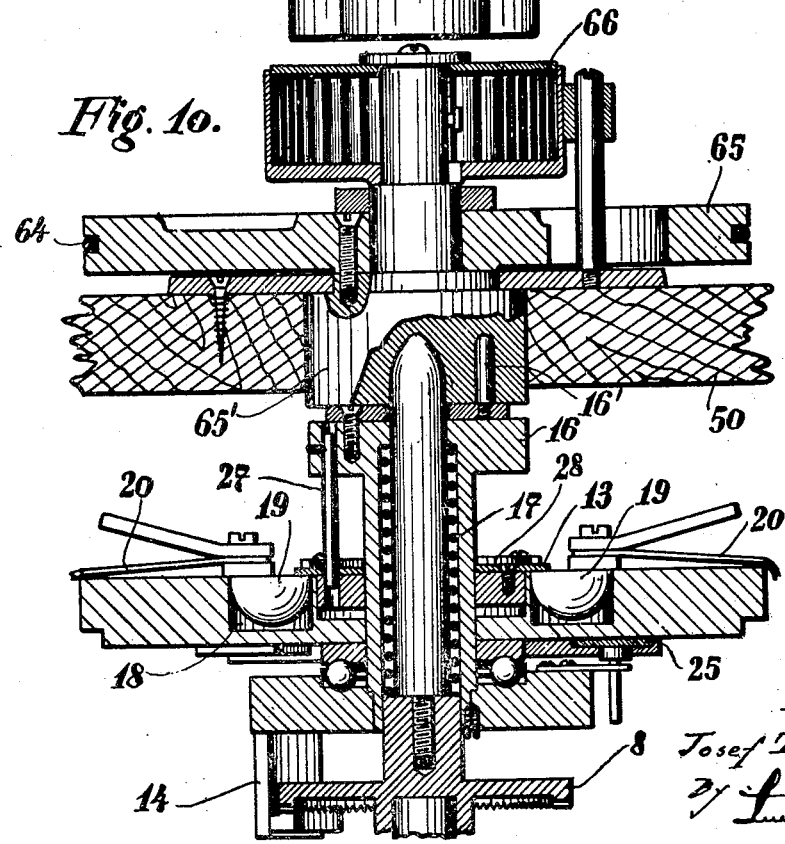

The Fig. 10 is a section through the timing device.

In the figures a basket 2 preferably made of light metal is attached to the casing 1. A charge may be suspended on the loop 3 beneath the casing. The clock-movement is mounted at the bottom of the casing. It comprises a barrel 6 and some wheels which transmit the movement of the barrel to a regulating flap 7 and to a timing crown wheel 8. The spring of the barrel may be wound up by means of an extensible key 9 and a pinion 10. Two pressure rods 11 and 12 (Fig. 7) serve as stopping and starting means of the movement. Rod 11 is shown depressed and carries a friction spring 110 bearing on a disk 111 on the regulator staff 7. In this position rod 11 is locked by a two-legged spring-controlled pendulum member 112 by a pin 113 which is fixed by means of a clamp to the rod 11 and arranged so as to slide along one leg of said member and to slip underneath this leg. On the other leg of said member 112 slides a pin 114 which is fixed to the rod 12 by means of a clamp. This rod 12 carries a friction spring 115 which in the depressed position of the rod acts like a brake on the disk 111 of the regulator. By depressing rod 11, the movement is stopped and by depressing rod 12, the member 112 will be pushed aside and rod 11 be freed but the movement will still remain braked by the spring 115 of the depressed rod 12.

If this rod 12 is released so as to spring back into its initial position the movement will be free to start. Moreover the clock-work is provided with a self stopping device which will be explained later.

The timing-crown wheel 8 is fast to its staff. It can be coupled with a release disk 13 by means of a toothed segment 14 which can be displaced axially relative to the shaft of the timing crown wheel. The rotating movement of the crown wheel will then be communicated to the toothed segment and to the release disk by means of a pin 27 which extends from the carrier disk 16 downwards and lodges within a hole of the release disk held by a ring 28 on the cover (Fig. 10). The timing crown wheel and the segment constitute a coupling thrown into and out of gear by axial movements.

Uncoupling of the toothed segment is effected when the carrier disk 16 moves in the direction of the arrow 15 (Fig. 7) and the coupling by a contrary pressure by a spring 17 shown in Fig. 10. If the timing crown wheel 8 turns under the effect of the started clock work the carrier and the release disk turn likewise. The latter is lodged directly on the cover 4 of the casing and partly covers recesses 18 arranged for receiving the fastening claws 19. These claws are provided at the ends of straps 20 attached to strong springs 21. The tension of these springs and the arrangement of the straps are that the edge of the release disk 13 retains the claws 19 within the excavations 18.

The release disk 13 possesses also two recesses 22 arranged diametrically opposite each other so as to register with the recesses 18. In this position the claws 19 are freed and the straps will be withdrawn by the springs so that the small auxiliary parachute 23 packed into the basket 2 is freed and when unfolding may also unfold the main parachute 24 packed likewise into the basket.

The toothed segment 14 is also connected to a graduated disk 25 which is visible through an opening 26 and which indicates the descent in hectometers or feet and corresponds to the respecting position of the recesses of the release disks with regard to the recesses 18.

If the device is used for dropping the bodies by hand it will suffice to stop the movement by means of the rod 11 and to exert a pressure on the carrier disk 16 in the direction of the arrow 15 so as to bring the release disk by means of this carrier disk into proper position, which corresponds to the numeral shown in the opening 26. When the carrier disk is released the toothed segment 14 meshes with the timing crown wheel and after having started the movement by a pressure on the rod 12 the apparatus may be dropped together with the charge. According to the timing, that is according to the time which the excavations of the release disk take for registering with the excavations 18 and the claws 19, the device will have moved through a greater or smaller descent until the parachute is unfolded. At this moment the fall will be retarded and the device will float to the ground. Two seconds after the release of the parachute the movement will stop automatically.

For this purpose an arm 120 in reach of the segment 14, which arm in the release position of the parachute swings around on the intermediate plate 121, will brake the regulating flap 7 by means of a spring. By displacing the segment from its zero position, that is by the timing of the device the additional brake will be released.

The graduation of the disk 25 is calculated according to the law of freely falling bodies to such an effect that the effective descent is a hundred meters less than indicated by the graduated disk, that is to say the parachute will unfold when the disk indicates zero corresponding to a hundred meters above the ground. In devices intended for dropping parachute lights the graduation of the disk corresponds to the effective descents.

If the whole device is intended to light a landing place a flare body 30 must be attached to the bottom of the casing. This flare body is provided at its top with a plate 31 guided within grooves 32. These grooves and a holding device maintain the plate 31 centrically with regard to the casing so that a primer lodged in the center of said plate registers with a firing pin 33 held by a flat spring so as to be able to issue from the casing. This pin is held in position beneath a pivoted arm 34 the free end of which is in the path of a percussion weight 36 which is guided on a vertical pin and worked upon by a spring 38. A pawl 37 is held pivotally by said weight so as to be engaged at its lower end by the catch 42 provided on a sleeve 40 which is slidably mounted on a pin 39 and extended to the outside of the casing where it is attached by a cord to the main parachute 24. By the pull exerted by this parachute, when it is unfolding in free air, this sleeve is moved upwards against the effect of a spring 35. When moving upwards the catch 42 takes the weight 36 along with it and bends the spring 38 until the curved upper end of pawl 37 strikes the point 41 screwed to the inside of the cover of the casing. This point will deflect the upper end of the pawl so as to disengage the lower end of the pawl from the catch and to free the weight 36 which under the effect of gravity and of the spring 38 will strike lever 34 and expel the firing pin 33 from the bottom of the casing so as to fire the flare body which is provided with a percussion fuse.

Now it often occurs that quite a number of mail bags or parachute lights or both together have to be dropped and that the pilot has not time enough for timing each device. Then the timing and dropping will have to be effected mechanically according to the arrangement shown in Figs. 4, 5, 6 and 9 for six devices. Such an arrangement can also be used for the dropping of a greater number of devices which could be arranged on a board 50 shown in Fig. 9. The basket is carried by the hooks 51 pivotally mounted on the top side of the board and extended to the bottom side. These hooks are linked together by members 52, 53, 54 in such a way that they can be moved simultaneously for freeing the basket and all the device. This movement is executed by means of the lever 55 held fast on a shaft 52 and attached by a cord 56 which is guided by a roller 56' to one of the cranks 58. The cranks 58 may be moved by the handle 59 secured to a shaft 60 slidably arranged within a bracket 60' which is attached to the air craft near the pilot's seat. The shaft 60 is provided with a sunk key 62 small enough to engage successively the cranks 58 separated by stationary plates 71. The shaft 60 is further provided with grooves 61 which will be engaged by a spring catch 63 for securing the registering of the key 62 with the cranks 58. By sliding the shaft 60 by means of handle 59 the pilot will be enabled therefore to operate any of the cranks 58 and to drop any of the devices attached to the same. The proper turn of each device to be dropped may be chosen at will. The baskets of the single devices may be engaged into the hooks 51 by pressure from beneath the board 50.

As seen from Fig. 10 also the carrier pin 16' will be engaged with the hub 65' of the sheave 65 simultaneously with the hooking-in of the basket. Then the pressure rod 12 is pressed down, so as to release the rod 11, but the rod 12 being held back by the board 50 will render impossible the starting of the clock movement. In this state the device will be carried by the air-craft until the dropping of the device takes place.

The timing of all the devices is operated simultaneously by the same cord 64 which runs over all the sheaves 65 (Figs. 4 and 5) of the last unto which it is attached. From the first sheave the cord is led over a guiding roller 64' to a timing disk 67. A handle 68 attached to this disk and provided with a spring catch 69' may be set along a notched segment 69 at certain angles corresponding to the time intended for the free fall of the body to be dropped and marked by the numeral 70 appearing in an opening of the guard of the disk 67. This numeral corresponds with the height of fall appearing in the opening 26 of the cover of the device, because by moving the handle 68 the cord 64 will transfer the adjusted angle to the carrier disk 16. While the timing of all the devices is made simultaneously the devices may be dropped singly in any turn by a single move of the handles 59.

If it is desired to drop the devices one after the other the timing of all the devices is first effected simultaneously and given by the number at 70 by a move of the handle 68. By an axial pull of the handle 59 the key 62 can be coupled with one of the cranks 58 and any of the devices be dropped.

The weight of the device, the pressure of the spring 17 and of the rod 12 will help the dropping of the devices after having withdrawn the hooks 51. As soon as the device is free from the board 50, the segment 14 and the timing crown wheel 8 will be coupled together and the clock movement has only to travel the distance determined by the handle 68 until the parachute is released. The movement is started when the rod 12 is free to shoot upwards.

If it is desired to drop a flare body the timing is adjusted to the number of hectometers or feet corresponding to the desired free fall of the device until it has reached the predetermined height of lighting. Thus an aircraft dropping a flare body from a height of two thousand meters will adjust the device for a fall of fifteen hundred meters in order to light the flare body at a height of five hundred meters. If however a compulsory night landing has to be effected where an immediate lighting is required the timing lever 68 is pushed to the foremost stop and works the lever 59 for the dropping while retiring the hand. Then with one move of the hand the flare body will be lit at about 25 meters underneath the air-craft and the landing place will be lit up as desired.

What I claim as new is:

1. In a device for controlling the descent of bodies dropped by parachutes from aircrafts, the combination of a basket-like enclosure to which is attached the body; a parachute attached to said basket and folded therein; means for holding the parachute in its folded state; a rotary release member adapted to release said holding means and to free the parachute; a casing in said basket and carrying the attaching and the releasing means of said holding means; a device for timing the release of the parachute comprising a clockwork at the bottom of the casing, a central axis in driving connection with said clockwork, a timing crown-wheel fast on this axis, a sleeve-like coupling member rotatably supported by a spring at the end of said axis and fixed to the above mentioned rotary released member, and a toothed segment fixed to said sleeve-like member; a barrel-actuated coupling member provided with holes for centering the end of said central axis and engaged by a coupling pin fixed to the sleeve-like coupling member; a sheave fixed to the last named coupling member; a second sheave provided with a handle rotatably mounted near the pilot's seat; a cord connecting the two sheaves; and a graduated segment surrounding the sheave with the handle and constituting the means for determining the timing.

2. In a device for controlling the descent of bodies dropped by parachute from aircrafts, the combination of means on the outside of the aircraft for supporting the bodies to be dropped; a basket-like enclosure having means for attaching the body; a parachute attached to said basket and folded therein; strap-like members for holding the parachute in its folded state; a rotary release member adapted to release said strap-like members and to free the parachute; a casing packed in said basket and carrying on its cover the attaching and the releasing means of said strap-like members; a dropping device for each basket and comprising hooks pivotally arranged on the supporting means on the aircraft and engaged with the rim of the basket; a link and lever device attached to said hooks; means operable by the pilot for moving said link and lever device; and a lighting flare attached to the bottom of the casing and adapted to be lit by the pull of the parachute when the latter unfolds.

3. In a device for controlling the descent of bodies dropped by parachute from aircrafts, the combination of a basket-like enclosure to which is attached the body; a parachute attached to said basket and folded therein; means for holding the parachute in its folded state; a rotary release member adapted to release said holding means and to free the parachute; a casing packed in said basket and carrying the attaching and the releasing means of said holding means; a dropping device for each basket, comprising hooks engaged with the basket; a link and lever device attached to said hooks; a pivoted lever capable of moving said link and lever device; a handle pivotally mounted near the pilot's seat; a cord connecting said handle to said pivoted lever; and a timing device for the release of the parachute.

In testimony whereof I affix my signature.

JOSEF TRITSCHLER.